(12) United States Patent
Yang et al.

(10) Patent No.: US 8,976,520 B2
(45) Date of Patent: Mar. 10, 2015

(54) REMOVABLE HARD DISK DRIVE HOLDER

(71) Applicant: Echostreams Innovative Solutions, City of Industry, CA (US)

(72) Inventors: Chin-Hao Yang, New Taipei (TW); Hsiao-Fen Peng, New Taipei (TW); Chang-Feng Chu, Taoyuan County (TW); Chia-Hung Liu, New Taipei (TW); Mu-Chuan Wang, New Taipei (TW)

(73) Assignee: Echostreams Innovations Solutions, City of Industry, CA (US)

( * ) Notice: Subject to any disclaimer, the term of this patent is extended or adjusted under 35 U.S.C. 154(b) by 14 days.

(21) Appl. No.: 13/668,276

(22) Filed: Nov. 4, 2012

(65) Prior Publication Data

US 2014/0022723 A1 Jan. 23, 2014

(30) Foreign Application Priority Data

Jul. 20, 2012 (TW) .............................. 101214071 U

(51) Int. Cl.
*G06F 1/16* (2006.01)
(52) U.S. Cl.
USPC ............ 361/679.37; 361/679.33; 361/679.38; 361/679.58
(58) Field of Classification Search
CPC ......... G06F 1/181; G06F 1/183; G06F 1/187; G06F 1/188; G06F 1/1616; G06F 1/184; H05K 7/1411; G11B 33/128; G11B 33/124; G11B 33/08; G11B 25/043
USPC .......... 361/679.33–679.39, 679.58, 724–727, 361/732, 747, 807, 810, 825; 312/223.1, 312/223.2, 332.1, 333; 248/200, 221.11, 248/220.21, 222.12, 694, 638; 292/DIG. 11, 292/DIG. 53, DIG. 54, 1, 137, 138, 145, 207
See application file for complete search history.

(56) References Cited

U.S. PATENT DOCUMENTS

| | | | | |
|---|---|---|---|---|
| 6,356,441 | B1 * | 3/2002 | Claprood ................. | 361/679.33 |
| 7,511,953 | B2 * | 3/2009 | Tao et al. ................. | 361/679.39 |
| 7,684,181 | B2 * | 3/2010 | Peng et al. ............... | 361/679.33 |
| 7,817,413 | B2 * | 10/2010 | Peng et al. ............... | 361/679.33 |
| 7,848,099 | B1 * | 12/2010 | Zhang et al. ............. | 361/679.38 |
| 2008/0298005 | A1 * | 12/2008 | Deng et al. .................... | 361/684 |

* cited by examiner

*Primary Examiner* — Lisa Lea Edmonds
*Assistant Examiner* — Christopher L Augustin
(74) *Attorney, Agent, or Firm* — Li & Cai Intellectual Property (USA) Office

(57) ABSTRACT

A removable hard disk drive holder made of a plastic unit enveloping a metallic unit comprises a bracket, a plate and a handle. The bracket has a front panel and two side plates. The two side plates extend toward the same direction perpendicularly from the opposite edge of the front panel. The front panel has a front panel pivot portion arranged over one edge thereof. The plate slidably engages with the front panel and has a latch fastening portion. The handle has a handle pivot portion and the handle fastening portion conforming to the latch fastening portion. The handle pivot portion is arranged over one edge of the handle and pivotally connected to the front panel pivot portion. The removable hard disk drive is structurally firm, light and thin and minimizing associated members.

8 Claims, 7 Drawing Sheets

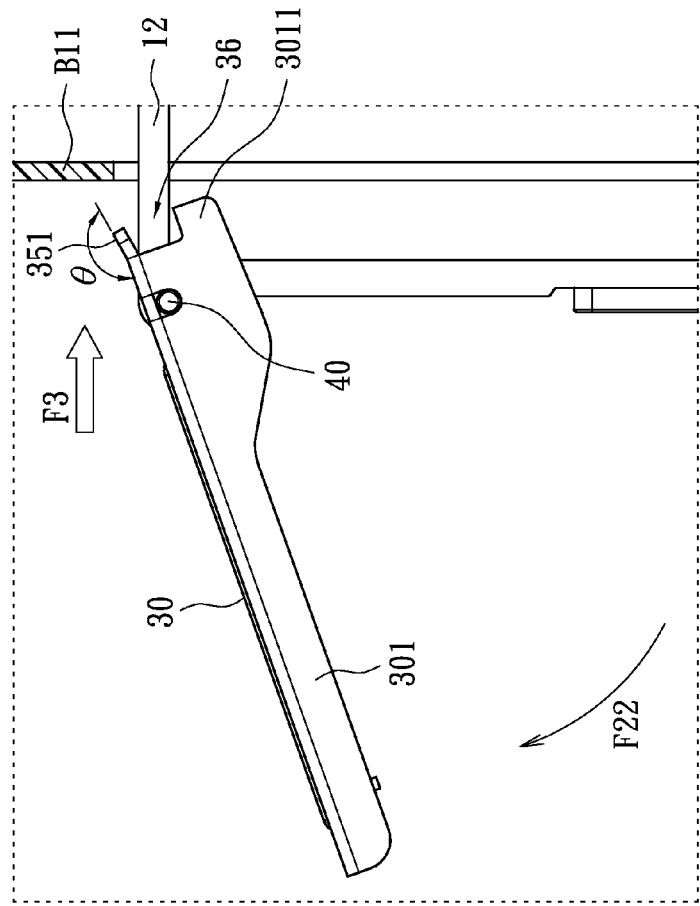
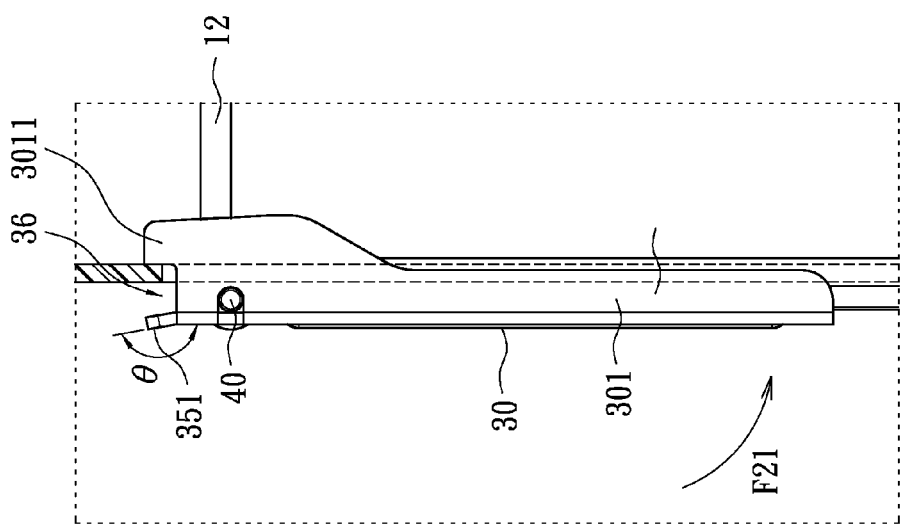
FIG. 4B
FIG. 4C

REMOVABLE HARD DISK DRIVE HOLDER

BACKGROUND

1. Field of the Invention

The instant disclosure relates to a removable hard disk drive holder; in particular, to a removable hard disk drive holder for locking the hard disk drive.

2. Description of Related Art

The standard removable hard disk drive holder are required to be robust, thin in structural profile and light in volume. In addition, minimizing the number of parts thereof to reduce manufacturing cost and maintenance issue is desired feature. However, the conventional removable hard disk drive holders often have complicated structure with a variety of elements which cause high production cost and bulky structure.

Moreover, it is also preferable for the hard drive holder to be solidly built yet with certain flexibility for the ease of assembly. Metallic materials are strong but heavy while plastic materials are lighter and easier to assemble but generally lack sufficient structural strength. In order to enhance the structure of the plastic built holder, more supporting members or specific structure is implemented resulting in high production cost in design and manufacturing.

To address the above issues, the inventor strives via associated experience and research to present the instant disclosure, which can effectively improve the limitation described above.

SUMMARY OF THE INVENTION

The object of the instant disclosure is to provide a removable hard disk drive holder combining the lightness of plastic materials and hardness of metallic materials to fulfill lighter volume, firm, easy to assemble without excessive members and lower production cost.

According to one exemplary embodiment of the instant disclosure, the removable hard disk drive holder comprises a bracket, a sliding latch, and a handle. The bracket includes a front panel and two side plates extending perpendicularly from the opposite edges of the front panel to the rear end. The sliding latch includes a latch fastening portion and slidably engages with the front panel. The handle includes a handle fastening portion and a handle pivot portion pivotally connecting the front panel pivot portion over one side of the handle. The handle fastening portion conforms to the latch fastening portion.

Preferably, the front panel has a front panel window with a front panel window frame. A pair of sliding rails is disposed on opposite edge of the front panel window respectively. The sliding latch also includes a pair of latch clamps enabling the sliding latch movably engaged with the front panel via the pair of sliding rails.

Preferably, the sliding latch has a latch window portion conforming to the front panel window. The latch window portion has a latch window frame. The latch fastening portion has at least one latch jaw and a tab receiving recess. The tab receiving recess is formed on one side of the latch window portion frame and the latch jaw extends toward the latch window portion.

Preferably, the handle has a handle window portion with a handle window frame. The handle fastening portion has a T-shaped tab over one edge of the handle window portion. The T-shaped tab includes a shoulder portion and a neck portion.

Preferably, the handle includes a pair of handle rails disposed on opposite edge of the handle substantially perpendicular thereto and extending toward the front panel. The handle further includes a handle pivot portion which has a wing tilting away from the front panel. One of the handle rails has protrusion which defines an opening together with the wing.

Preferably, the two side plates have a plurality of holes which are screw holes and reserved holes.

Preferably, the bracket is made of plastic material enveloping a metallic inner frame to form an integrated structure. The metallic inner frame is arranged over the front panel and extending along the bracket frame.

Preferably, each of the side plates has at least one grounding edge.

Preferably, a supportive strut is arranged between the two side plates.

The instant disclosure is thinner in structural profile yet still solid built and easy to assemble because of reduced associated members. Therefore the instant disclosure effectively lower the production cost.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

BRIEF DESCRIPTION OF THE DRAWINGS

FIGS. 4A~4C are a series of actions showing assembly of a removable hard disk drive in accordance with the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
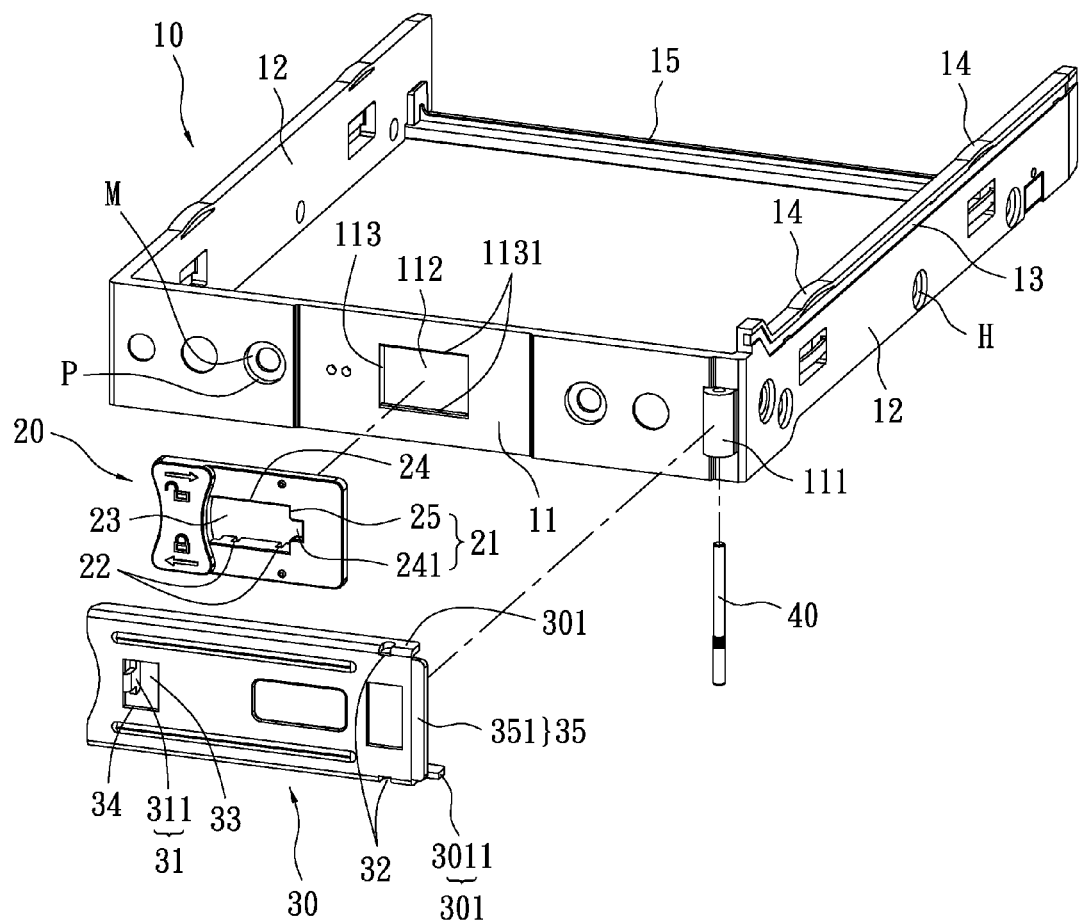
FIG. 1 is an exploded view showing a removable hard disk drive holder in accordance with the instant disclosure.
Figure 2:
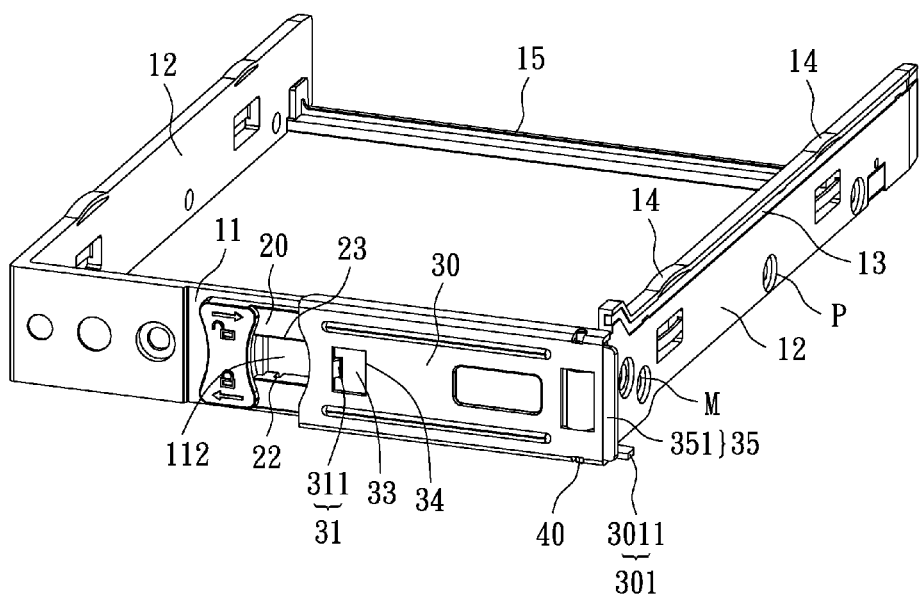
FIG. 2 is a perspective view showing a removable hard disk drive holder in accordance with the instant disclosure.

Please refer to FIG. 1 in conjunction with FIG. 2. The instant disclosure provides a removable hard disk drive holder which comprises a bracket 10, a sliding latch 20 and a handle 30. The bracket 10 includes a front panel 11 and two side plates 12. The two side plates 12 are disposed at opposite edge of the front panel 10 respectively and extend perpendicularly toward the same direction. The front panel 10 also includes a front panel pivot portion 111.

The sliding latch 20 includes a latch fastening portion 21 and a pair of latch clamps 22 to allow slidable engagement with the front panel 11.

The handle 30 includes a handle pivot portion 32 and a handle fastening portion 31 which is received by the latch fastening portion 21. The handle pivot portion 32 occupies one edge of the handle 30 and pivotally connecting the front panel pivot portion 111.

Preferably, the bracket 10 may be a plastic element P which envelopes a metallic element M to form an integrated piece. The metallic element M is arranged in the front panel 11 and stretches along the frame of the bracket 10. The combination of the plastic and metallic elements P and M provides lighter yet strong structure together with thinner structural profile.

Preferably, please refer to FIGS. 1, 2, 3A and 3B. The front panel 11 further includes front panel frame 113 that defines a front panel window 112. The front panel window frame 113 has a pair of sliding rail 1131 disposed on a parallel pair of the edges of the front panel window frame 113. The latch clamps 22 slidably mounted on the sliding rails 1131, thus allowing the sliding latch 20 to slide along the front panel 11.

Preferably, the sliding latch 20 further includes a latch window portion 23 conforming to the front panel window 112. The latch window portion 23 is surrounded by a latch window frame 24. The latch fastening portion 21 may have a tab receiving recess 241 and at least one latch jaws 25. The tab receiving recess 241 is arranged on one edge of the latch window frame 24 and the latch jaw 25 projects toward the latch window portion 23 from the latch window frame 24. In the instant embodiment, two latch jaws 25 are formed on either side of the tab receiving recess 241 as a preferred example and the structure thereof is not limited thereto.

The pair of latch jaws 25 and the tab receiving recess 241 together receive and lock the handle fastening portion 31. Furthermore, the shape, size and number of the latch window portion 23 can vary. Please refer to FIG. 5 for another embodiment showing a different example of the sliding latch 20 in accordance with the instant disclosure. The difference between the examples in FIG. 1 and FIG. 5 arises from the latch window portion 23 which is smaller in the embodiment in FIG. 5 yet still with the tab receiving recess 241 and latch jaws 25. The fastening portion 21 in FIG. 5 is disposed in a different edge of the sliding latch 20 while serving the same function as well.

Figure 5:
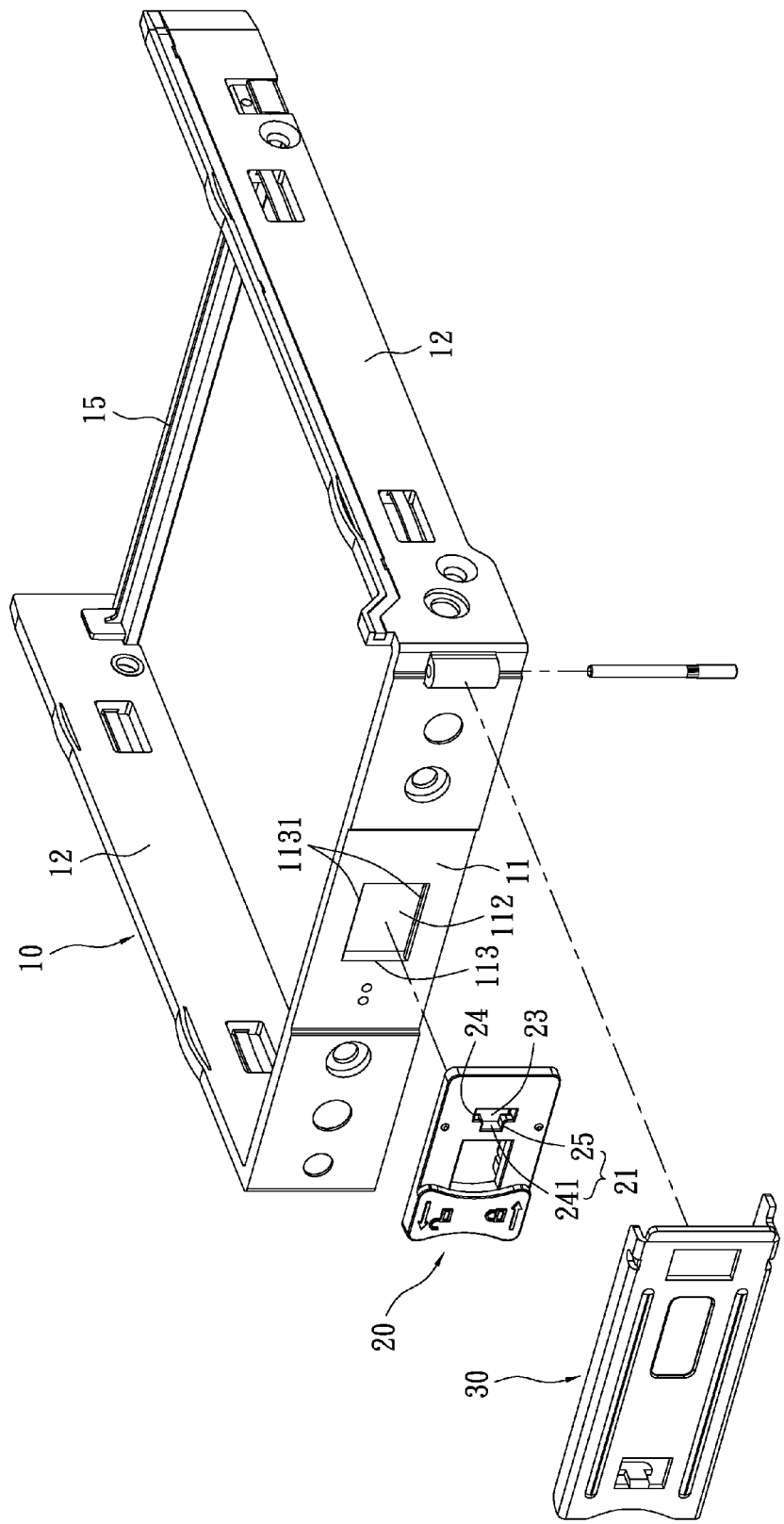
FIG. 5 is a removable hard disk drive holder of an embodiment in accordance with the instant disclosure.

The following description is based on the embodiment in FIG. 1 yet the embodiment in FIG. 5 can sill be referenced regardless the difference of the latch fastening portion 21. The handle 30 further includes a handle window portion 33 with a handle window frame 34. The handle fastening portion 31 includes a T-shaped tab 311 stretching outwardly toward the latch fastening portion 21. However, the T-shaped tab 311 is a preferred example in the instant embodiment and the structure of the tab is not limited thereto.

Figure 3A:
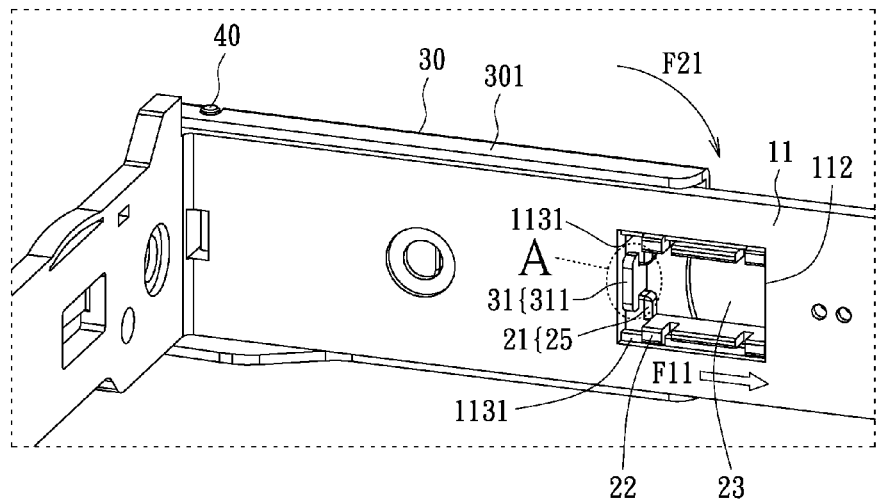
FIG. 3A is an enlarged view showing a removable hard disk drive holder under released state in accordance with the instant disclosure.
Figure 3B:
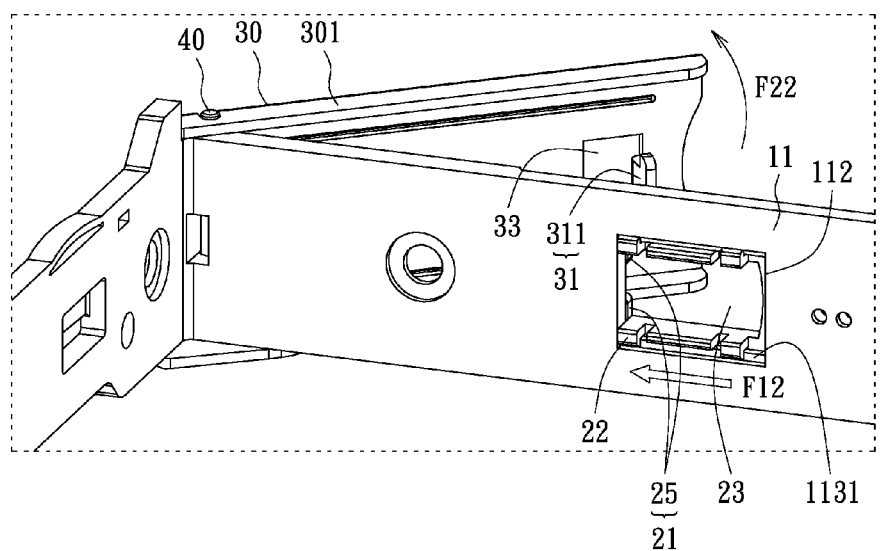
FIG. 3B is an enlarged view showing detail of a removable hard disk drive holder under locked state in accordance with the instant disclosure.
Figure 6:
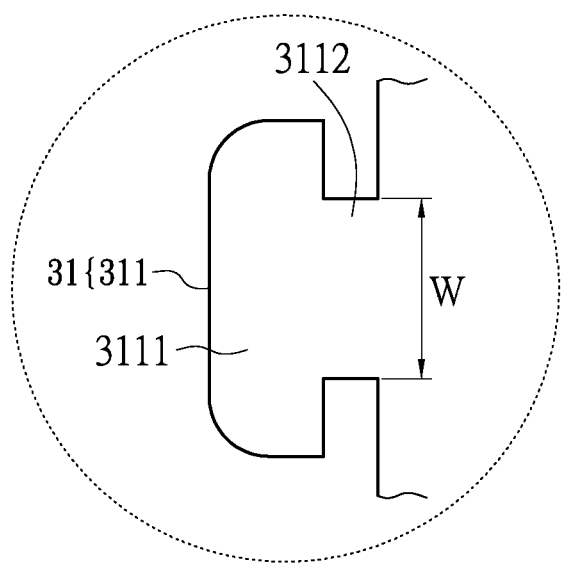
FIG. 6 is an enlarged view of an enlargement portion A of FIG. 3A showing a T-shaped tab including a shoulder portion and a neck portion.

Please refer to FIG. 3A in conjunction with 3B. When the handle 30 moves along a close direction F21 toward the sliding latch 20, the T-shaped tab 311 firstly passes through the opening of the latch window portion 23 superposing the front panel window 112. Meanwhile the handle window portion 33 superposes the plate and the front panel windows 23, 112. Then, the sliding latch 20 move along the sliding rail 1131 via the latch clamps 22 toward a lock-up direction F11 to allow firm engagement between the T-shaped tab 311 and the latch fastening portion 21. In other words, the T-shaped tab 311 is received by the tab receiving recess 241 and further held by the latch jaws 25, therefore completing the locking. Specifically, referring to FIG. 6 which shows an enlarged view of an enlargement portion A of FIG. 3A, the T-shaped tab 311 includes a neck portion 3112, and a shoulder portion 3111 arranged at the free end of the tab. A width W of the neck portion 3112 spanning from a side of the neck portion 3112 configured to engage one of the latch jaws 25 to another side of the neck portion 3112 configured to engage the other latch jaw 25 is substantially equal to a distance between the latch jaws 25. A distance between the shoulder portion 3111 of the handle fastening portion 31 and the handle 30 is substantially equal to the thickness of the latch jaws 25 of the latch fastening portion 21. During engagement between the T-shaped tab 311 and the latch fastening portion 21, the latch jaws 25 of the latch fastening portion 21 grip the neck portion 3112 of the handle fastening portion 31, and the shoulder portion 3111 of the handle fastening portion 31 in conjunction with the handle 30 grips the latch jaws 25 of the latch fastening portion 21.

In contrast, when releasing the hard disk drive, the sliding latch 20 moves along the sliding rail 1131 toward a releasing direction F12 so the T-shaped tab 311 moves out of the tab receiving recess 241 and is released by the latch jaws 25. Hence, the handle 30 can be opened toward an open direction F22.

Please refer to FIGS. 1, 3A, 3B and 4A. The handle 30 has a pair of cover rails 301 which is substantially perpendicular to the handle 30, extends toward the front panel 11 and partially encloses the upper and lower edges thereof. The handle 30 further includes a handle pivot member 35 with a wing 351 tilting away from the front panel 11. One of the cover rails 301 has a protrusion 3011 and the protrusion 3011 and the wing 351 define an opening 36.

Preferably, the side plates 12 include a plurality of holes H. The holes H can be used for receiving bolts or being reserved holes. The bolt holes can firmly secure the hard disk drive to the side plates 12. The side plates 12 may include a light guide groove 13. The light guide groove 13 extends to the upper edge of the front panel 11 from the side plate 12. When the light guide groove 13 is arranged with a light guide (not shown in the figure), the light guide directs the hard disk drive status indicator to the front panel 11, thus showing the hard disk drive status without demounting the removable hard disk drive holder.

Preferably, a supportive strut 15 is disposed in between the side plates 12. The supportive strut 15 provides better structural support to the side plates 12 and the entire bracket 10. Especially when a hard disk drive is not attached to the hard disk drive, the supporting strut 15 effectively minimizes damages by external shocks. In addition, the supportive strut 15 helps the bracket 10 to retain a mounted hard disk drive. Besides, as shown in the FIGS. 1 and 5, the connection between the strut 15 and side plates 12 may vary according to the structure thereof and not limited thereto.

Figure 4A:
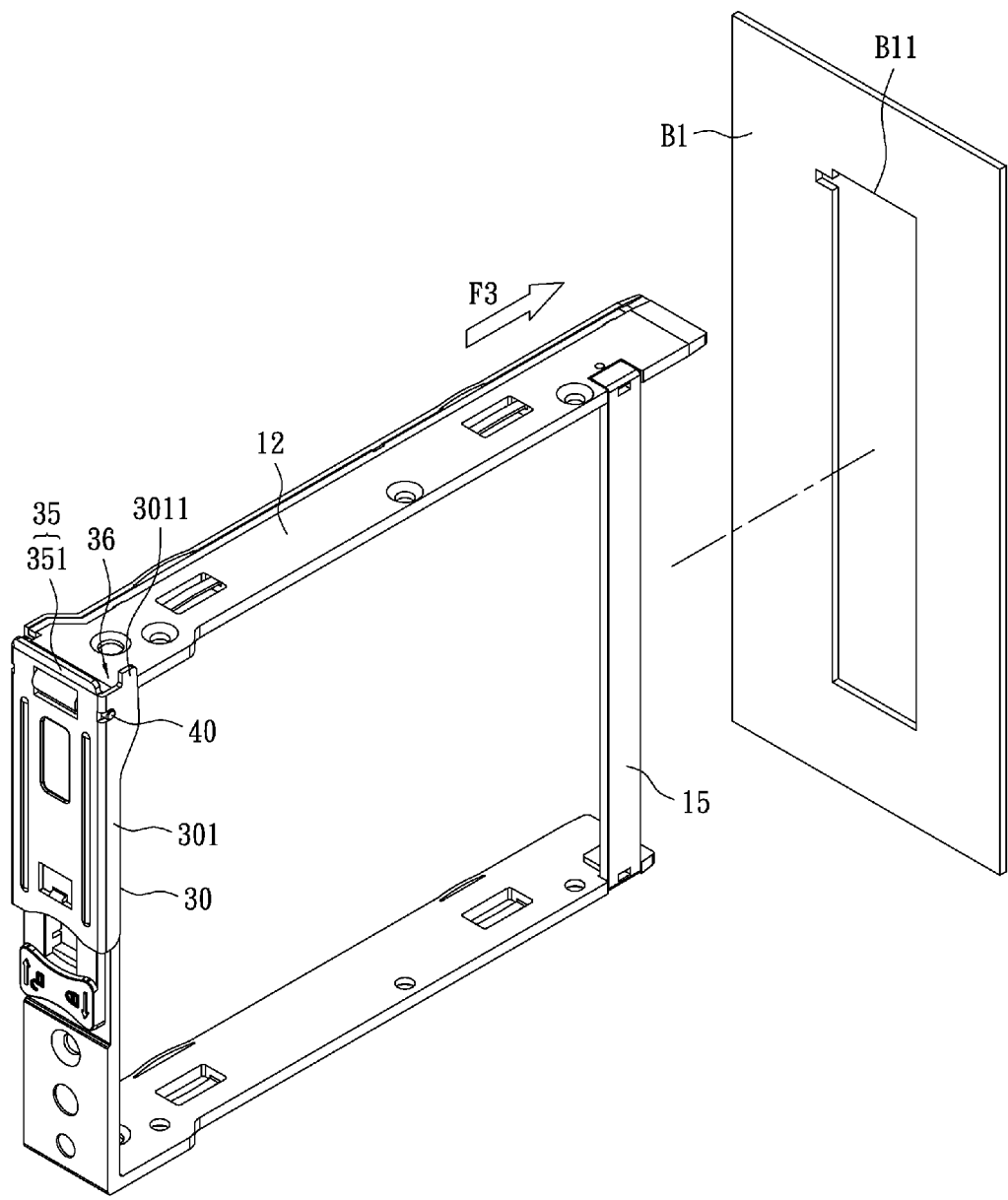

Please refer to FIGS. 4A, 4B and 4C illustrating a series of actions of the removable hard disk drive holder assembly. As shown in FIG. 4A, given that a hard disk drive (not shown in the figure) is installed on the removable hard disk drive holder and the removable hard disk drive holder is moving along an assembly direction F3 toward a chassis B1. Firstly, as shown in FIG. 4B, the handle 30 is pulled toward the open direction F22 and the removable hard disk drive holder is pushed toward the assembly direction F3. The protrusion 3011 rotates to allow the entry of the removable hard disk drive to the chassis B1.

Moreover, please refer to FIG. 4C, the wing 351 tilts away from the opening 36 to allow a wider opening. When locking the handle 30 toward a closing direction F21, a chassis wall B11 is received by the opening 36 and abuts the protrusion 3011 while the wing 351 does not contact the chassis wall B11. The protrusion 3011 retains the chassis wall B11 as the handle 30 is completely closed. When the plate 12 is pushed toward the lock-up direction F11, the latch fastening portion 21 further secures the handle 30 by latching the handle fastening portion 31 (as shown in FIG. 3A) so the handle 30 cannot be opened unless releasing the plate 12. Hence, the protrusion 3011 firmly engages the removable hard disk drive holder and the chassis B1.

Preferably, the side plates 12 further include at least one elastic grounding edge 14 so the removable hard disk drive holder can be tightly engaged with the chassis B1.

In summary, the removable hard disk drive holder satisfies being both structurally firm and light and the associated members are minimized to reduce production cost.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A removable hard disk drive holder comprising:
   a bracket including a front panel and two side plates, the side plates extending from opposite edges of the front panel substantially perpendicular thereto, the front panel including a front panel pivot portion, the front panel formed with a front panel window portion, and the front panel including two sliding rails arranged at opposite sides of the front panel window portion,
   a sliding latch including two latch clamps slidably gripping the sliding rails respectively, the sliding latch formed with a latch window portion and a latch fastening portion, and the latch fastening portion including two latch jaws and a tab receiving recess formed between the two latch jaws; and
   a handle including a handle fastening portion and a handle pivot portion, the handle pivot portion arranged on one edge of the handle and pivotally connected to the front panel pivot portion, and the handle fastening portion being a substantially T-shaped tab protruding from the handle toward the latch window portion, the handle fastening portion including a neck portion and a shoulder portion arranged at the free end of the tab, wherein a width of the neck portion spanning from a side of the neck portion configured to engage one of the latch jaws to another side of the neck portion configured to engage the other latch jaw is substantially equal to a distance between the latch jaws, and a distance between the shoulder portion of the handle fastening portion and the handle is substantially equal to the thickness of the latch jaws of the latch fastening portion; wherein
   when the handle pivots about the front panel pivot portion to contact the sliding latch, the neck portion of the handle fastening portion is aligned to the tab receiving recess of the latch fastening portion, and when the tab receiving recess slides toward the neck portion, the latch jaws of the latch fastening portion grip the neck portion of the handle fastening portion, and the shoulder portion of the handle fastening portion in conjunction with the handle grips the latch jaws of the latch fastening portion.

2. The removable hard disk drive holder according to claim 1, wherein the handle is formed with a handle window portion for exposing the handle fastening portion.

3. The removable hard disk drive holder according to claim 2, wherein the handle includes a pair of cover rails, the pair of cover rails flushing the opposite edges of the front panel and substantially perpendicular to the handle, one of the pair of cover rails has a protrusion, the handle pivot portion has a wing tilting away from the front panel, and the protrusion along with the wing defines an opening.

4. The removable hard disk drive holder according to claim 1, wherein the pair of side plates includes a plurality of holes acting as bolt receiving holes and reserved holes.

5. The removable hard disk drive holder according to claim 1, wherein at least one of the side plates includes a light guide groove which stretches toward one edge of the front panel.

6. The removable hard disk drive holder according to claim 1, wherein the bracket is a plastic unit enclosing a metallic unit, the metallic unit is arranged in the front panel and extending along the bracket.

7. The removable hard disk drive holder according to claim 6, wherein the pair of side plates further includes at least one grounding edge.

8. The removable hard disk drive holder according to claim 1, wherein a supportive strut is disposed in between the pair of side plates.

* * * * *